United States Patent [19]
Fukuyama et al.

[11] Patent Number: 4,963,986
[45] Date of Patent: Oct. 16, 1990

[54] IMAGE INPUT APPARATUS FOR RESETTING THE AMOUNT OF EXPOSURE FROM A CORRECTION VALUE FOR A PREDETERMINED STANDARD VALUE

[75] Inventors: Shigeru Fukuyama; Tadashi Okino, both of Yokohama, Japan

[73] Assignee: Canon Kabushiki Kaisha, Tokyo, Japan

[21] Appl. No.: 230,998

[22] Filed: Aug. 11, 1988

[30] Foreign Application Priority Data

Aug. 12, 1987 [JP] Japan .................................. 62-199877

[51] Int. Cl.$^5$ ........................................... H04N 5/238
[52] U.S. Cl. ...................................... 358/228; 358/210
[58] Field of Search ............... 358/909, 228, 227, 210, 358/209

[56] References Cited

U.S. PATENT DOCUMENTS

| | | | |
|---|---|---|---|
| 3,417,198 | 12/1968 | Loyd | 358/210 |
| 4,120,004 | 10/1978 | Coutta | 358/228 |
| 4,225,886 | 9/1980 | Smith | 358/210 |
| 4,326,221 | 4/1982 | Mallos et al. | 358/210 |
| 4,543,609 | 9/1985 | Smith | 358/210 |

Primary Examiner—Stephen Brinich
Attorney, Agent, or Firm—Fitzpatrick, Cella, Harper & Scinto

[57] ABSTRACT

An image input apparatus having a lens unit and a photoelectric transducer and includes an automatic exposure circuit for controlling an amount of exposure onto the photoelectric transducer so that it becomes a predetermined standard value, a correction circuit for modifying the standard value, and a reset circuit for converting a correction value corrected by the correction circuit into the aforementioned standard value. Also provided is a controller for selecting a first mode for modifying data representing an amount of light exposure on the photoelectric transducer, and a second mode for modifying data representing a focal length of the lens unit. The reset circuit further includes a common increase/decrease change-over switch for increasing and decreasing corresponding data in each mode selected by the controller.

17 Claims, 7 Drawing Sheets

IMAGE INPUT APPARATUS FOR RESETTING THE AMOUNT OF EXPOSURE FROM A CORRECTION VALUE FOR A PREDETERMINED STANDARD VALUE

BACKGROUND OF THE INVENTION

1. Field of the Invention

This invention relates to an image input apparatus, and more particularly to an improvement in means for modifying the exposure thereof.

2. Description of the Prior Art

In a conventional image input apparatus having a lens unit and a photoelectric conversion means, modification of exposure is performed by manually adjusting the iris of the lens unit.

However, since this kind of the apparatus is of manual adjustment, its operation is troublesome, its accuracy is poor, and there is a posibility of producing a deflection of the image due to vibration; thus is desirable to provide an automatic exposure mechanism.

However, because then nature of image originals may cover an extremely large variety, e.g., letters, picture tones, photographic tones, or black and white, color and the like, it is actually extremely difficult to provide a proper exposure with the naked eye for all of these originals, and it becomes necessary to perform some degree of exposure correction.

In such a case, as for the adjutment operation, a method can be considered wherein an iris is opened or closed step by step by a motor with the aid of, for example, a button and the like. However, this method is extremely troublesome, since a reverse operation with regard to the correction operation described above must be repeated when the correction value is returned to the original standard value of the automatic exposure mechanism.

SUMMARY OF THE INVENTION

The present invention has been proposed taking the problems described above into consideration. It is object of the present invention to eliminate the disadvantages described above, and to provide an image input apparatus having excellent operability.

In the preferred embodiments of the present invention, the aforementioned object can be achieved by providing automatic exposure means for controlling an amount of exposure onto the aforementioned photoelectric conversion means, so that it becomes a predetermined standard value, correction means for modifying said standard value and reset means for converting a correction value corrected by said correction means into the aforementioned standard value.

With the configuration as described above, the operability of the device when the correction value is returned to the standard value is largely improved.

According to one aspect of the invention there is provided an image iput apparatus which comprises a lens unit, photoelectric conversion means, automatic exposure means, and correction means. The photoelectric conversion means is arranged to be exposed to optical images from the lens unit. The automatic exposure means is arranged to control an amount of exposure of the photoelectric conversion means so that the amount of exposure becomes a predetermined stardart value. The correction means is arranged for adjusting the automatic exposure means to modify the standard value to a correction value. The reset means is arranged for converting the correction value to the predetermined standard value.

According to a further aspect of the invention there is provided an image input apparatus which comprises a lens unit, a phootelectric convertion unit, a selection means and a common increase/decrease change-over switch. The photoelectric conversion unit photoelectrically converts light received through the lens unit. The selection means is arranged to select a first mode for modifying data representing an amount of light exposure on the photoelectric conversion unit and a second mode for modifying data representing a focal legth of the lens unit. The change-over switch is arranged to increase and decrease corresponding data in each mode selected by the selection means.

According to another aspect of the invention, an image input apparatus with a lens unit, a photoelectric conversion unit and a change-over switch as above described is provided with selection means having a first mode for modifying data representing an amount of light exposure on the photoelectric conversion unit and a second mode for modifying data representing a position of the focus of the lens.

According to a still further aspect of the invention, an image input apparatus with a lens unit, a photoelectric conversion unit and a change-over switch as above described, is provided with a selection means having a first mode for modifying data representative of a focal length of the lens unit and a second mode for modifying data representative of a position of the focus of the lens unit.

Other objects, configurations and effects of the present invention will become apparent from the following description in connection with the accompaying drawings.

BRIEF DESCRIPTION OF THE DRAWINS

DETAILED DESCRIPTION OF THE PREFERRED EMBODIMENT

Figure 1:
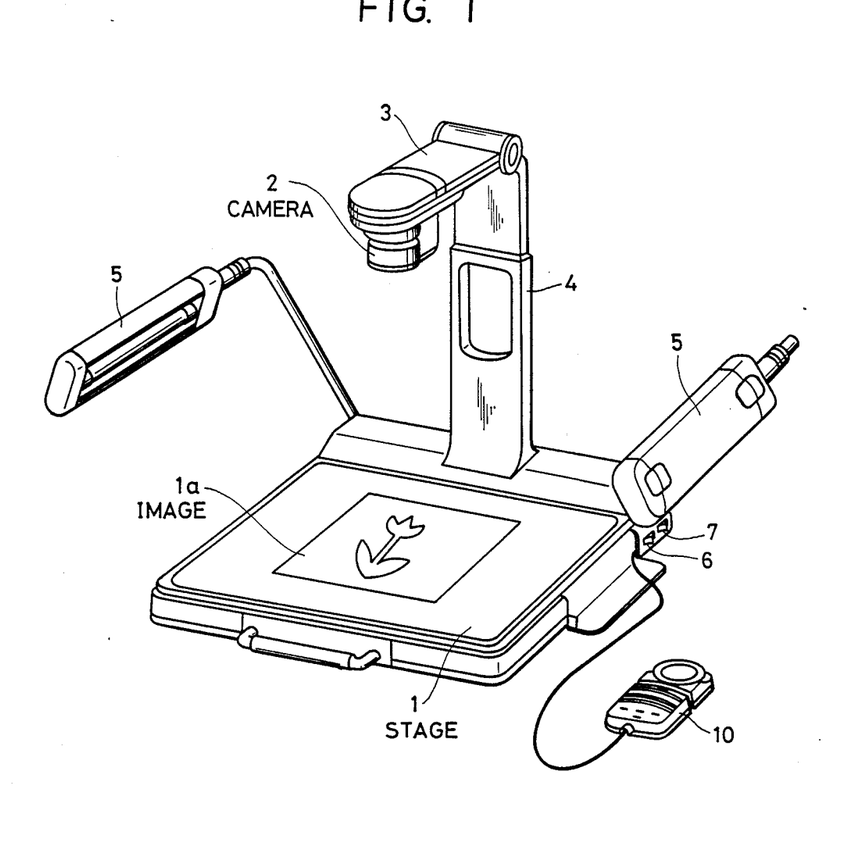
FIG. 1 is a total perspective view of an image input apparatus according to the present invention.
Figure 2:
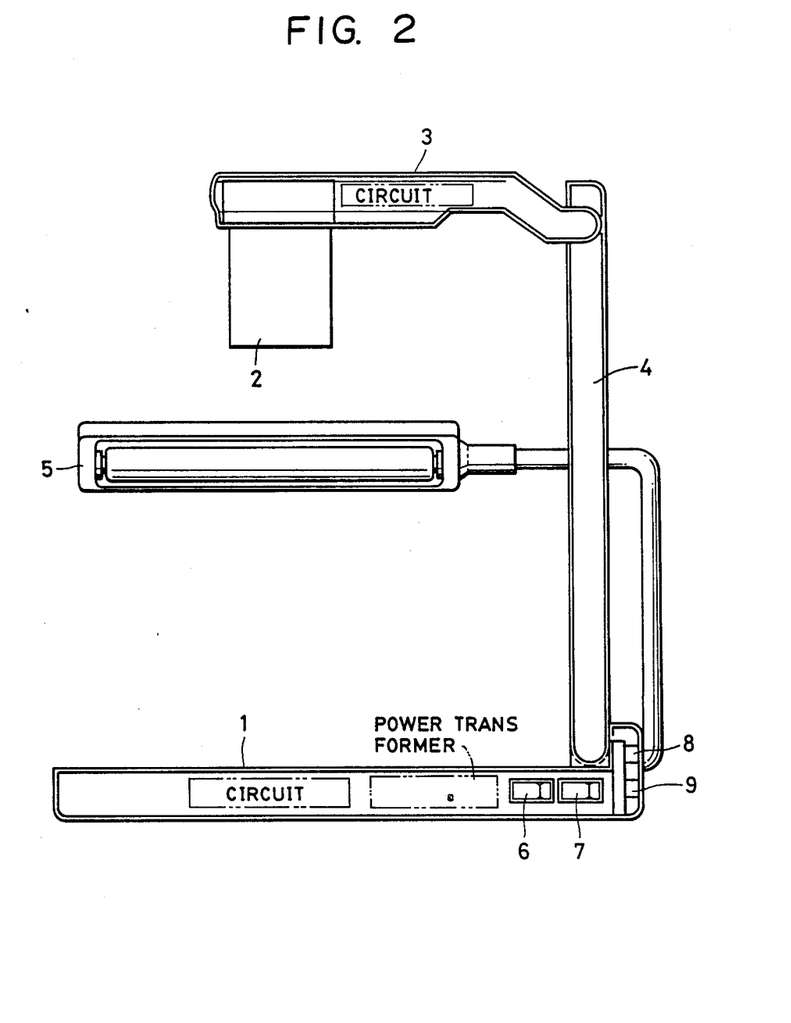
FIG. 2 is a side elevational view, taken in section, of the apparatus of FIG. 1.

In FIGS. 1 and 2, there is shown a stage 1 on which an image 1a to be read in mounted. Here, in order to adjust the white balance of a video camera 2 including a color photoelectric conversion unit for reading images of originals and the like to be hereafter described, a surface of the camera side of the stage 1 is colored achromatic gray. A surface of the camera side of the stage may be colored white, but in order to prevent too much light being incident upon the photoelectric conversion unit within the camera 2 which occasionally saturates the output of the photoelectric conversion unit resulting in an improper white balance adjustment, a gray color with a low reflectivity is preferable to a white color. The stage 1 may also be a diffused reflecting board in order to prevent the incidence of diffused reflection light from the stage 1 into the camera 2. The camera 2 is fixed to and is suported by a horizontal support member 3. The camera 2 also includes a color photoelectric conversion unit. A vertical support member 4 is fixed to the stage 1; and the horizontal support member 3 is connected to the stage 1 via the vertical support member 4. Illuminating devices 5 are disposed on upper portions of both sides of the stage 1, and are used when the stage 1 is dark, or when a shade or the like is used to prevent the incidence of regular reflection light from a room lamp into the camera as when an original written on a transparent sheet or the like is to be input into the camera 2. The illuminating devices 5 can be switched by a switch 6. A power switch 7 is also provided in the present apparatus.

An external input terminal 8 is provided introducin input image signals from the outside; and the external input entered therein goes out from a monitor output terminal 9. A remote control device 10, to be described hereafter, eletrically operates each operation unit to carry out focusing, zooming and the like for forming an image on the stage 1 onto the camera unit 2. In the drawing, the remote control device 1 is connected to the body of the apparatus by a cord, but of course the remote control devi may be of a wireless type.

Figure 3:
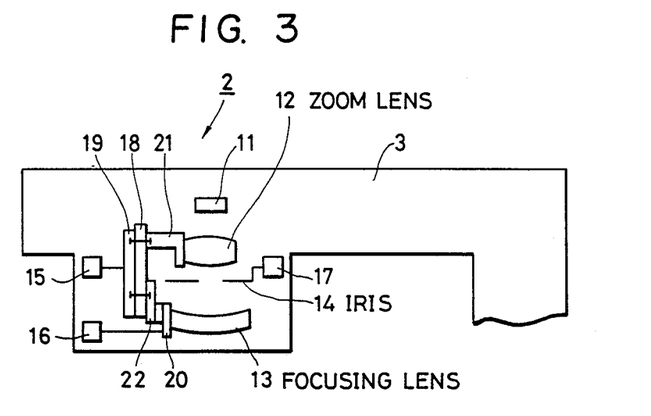
FIG. 3 is an enlarged fragmentary view showing a lens portion of the apparatus.

FIG. 3 illustrates a CCD (charge-coupled devices) 11 which receives an image 1a from the stage 1 via a zoom lens 12 and a focusing lens 13. The zoom lens 12 is fixed to a moving tube 21, and is driven by a motor 15 through a cam tube 19. The focusing lens 13 is mounted to a focusing frame 20, and fixed to a moving tube 22; and is driven by a motor 16 through a cam tube 19. An iris 14 is opened or closed by a motor 17. A fixed tube 18 is fixed to the horizontal support member 3; and the moving tubes 21 and 22 and the ca tube 19 are rotatably mounted thereto.

Figure 4:
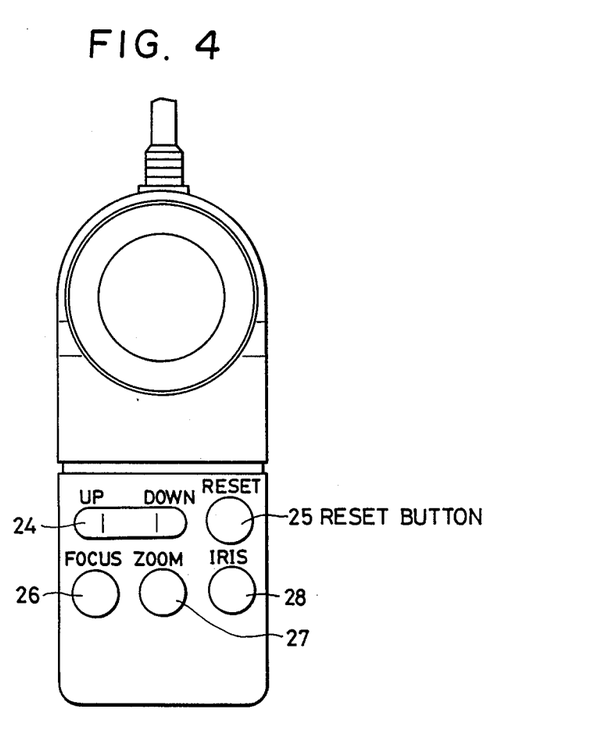
FIG. 4 is a front view of an operation unit of a remote control device used with the apparatus of FIGS. 1-3.

FIG. 4 illustrates a front view of an operation unit of the remote control device 10. An "up"/"down" button 24 may be pressed to adjust focusing, zooming, and iris settin. A reset switch 20 may be pressed to cause the iris 14 is to assume a predetermined value.

A focusing button 26, a zooming button 27, and an iris button 28 are provided on the control device 10. After pressing a respective one of these buttons, an adjustment of the focusing lens 13, the zoom lens 12, or the iris 14 can be performed with the up/down button 24.

Figure 5:
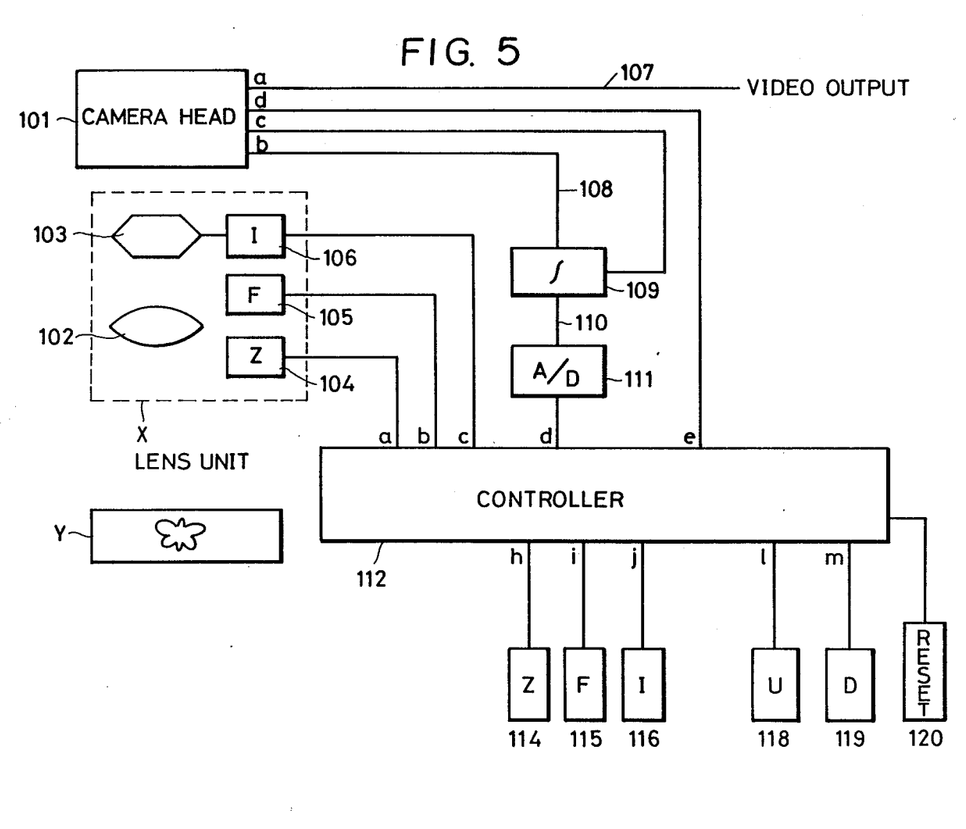
FIG. 5 is a block diagram of control system used in the apparatus of FIGS. 1-4.

As shown in FIG. 5, the control portion of the apparatus of FIG. 1 includes a camera head 101 for photographing an object Y. A lens assembly X is mounted to a front portion of the camera head for imaging the image of the object Y onto the image pickup element CCD within said head. The lens assembly X comprises a zoom optical lens 102, and iris 103, a motor for zooming adjustment 104, a motor for focusing adjustment 105, and a motor for iris ajustment control 106.

Here, each of motors 104, 105 an 106 is a device which can convert electric energy into mechanical energy, such as a d.c. motor, a stepping motor, an ultrasonic motor and the like. Each motor is capable of automatically moving in opposite directions by an order from a controller 112 to be described hereafter. With regard to this movement in both directions, the motor 104 performs a "tele"/"wide" operation, the motor 105 performs a focusing "near"/"far" operation, and the motor 106 performs an iris "open"/"close" operation; and the motors are capable of perfoming zooming, focusing and iris (amount of exposure) adjustment, respectively. Here, for the purpose of simplifying the explanation, each of the motors 104, 105 and 106, connected to terminals a, b, and c, respectively. is assumed to be a stepping motor.

The image information of the object Y is output from the camera head 101 via an output line 107 from a terminal a as video signals for NTSC or the like. At the same time, the luminance signals output from the camera head 101 to line 108 via a terminal b are integrated in an integral circuit 109 which performs a proper weighting in accordance with signals provided from a terminal d of the camera head 101 in order to detect the average luminance of the object Y. After performing and A/D conversion by an A/D converter 111, an exposure input is provided to a controlled 112 which is a control device of the whole system.

The camera head 101 sends out synchronizing signals from a terminal c into the integral circuit 109 to give the reset timing of the integrated waveform, an at the same time sends out timing pulses from the terminal d into terminal of the controller 112 to desginate timings for receiving the integrated waveform into the controller 112.

Operation units 114, 115, and 116 are provided in the controller 112 for designating zooming, focusing, and iris operations, respectively, and, for example, when an input from any of these units becomes "high", the controller 112 is notified that the operation has been desiginated.

"Up"/"down" operation units 118 and 119 are connected, respectively, to input terminals 1 and m, respectively, of the controller 112 an when an input from any of these units becomes "high", the controller 112 performs an "up"/"down" operation for the "tele"/"wide" operation of the zooming operation, "near"/"far" operation of the focusing operation, and the "open"/"close" operation of the iris operation, respectively. A reset switch 120 to be described hereafter, is also arranged on the controller 112.

Each operation unit described above, for example the units 112-120, may be a remote control device, or it may be incorporated within the body of the apparatus.

Figure 6:
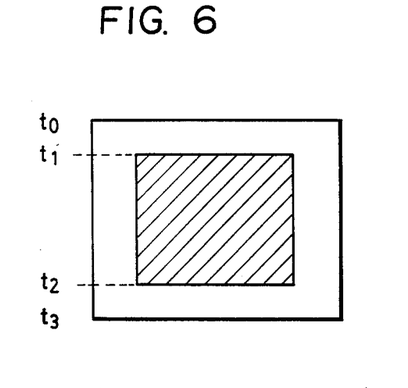
FIG. 6 is a diagram of a photometric domain with regard to a picture made with the apparatus FIGS. 1-5.

The operation of the present embodiment with a configuration as described above will now be explained with reference to FIGS. 6 through 8.

First, the iris control will be explained. FIG. 6 represents a photometric domain with regard to a picture, as example of which is a case wherein a part of the total picture is photometrically measured with a uniform weighting in FIG. 6, the region bounded by the lines ($t_1$-$t_2$) is a region of photometry. FIG. 7 shows timing waveforms of each signal related to the iris control corresponding to each region in FIG. 6.

Figure 7:
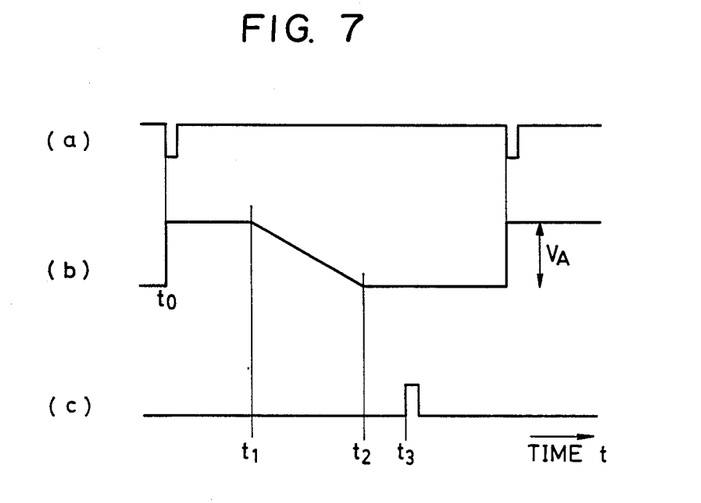
FIG. 7 is a timing waveform diagram of an iris adjustment-related signal used in the apparatus of FIGS. 1-6.

The waveform (a) in FIG. 7 represents a vertical synchronizing signal output from the terminal c of the camera head 101 into the integral circuit 109. The waveform in FIG. 7 represents an integrated output of the integral circuit 109. Also, the waveform in (c) in FIG. 7 represent a timing pulse output from the terminal d of the camera head 101 into the controller 112.

As shown in FIG. 7 (b), the integrated output is cleared by the front line of the vertical synchronizing signal, and changes between the region of photometry ($t_1$–$t_2$), but thereafter maintains a constant value until the next synchronizin signal is relecved. Now, this constant value is set in the controller 112 with a timing pulse ((c) in FIG. 7) which is input at a time $t_3$ during a certain period; and the iris 103 is adjusted according to the result of the photometry (an integrated value $V_A$ in FIG. 7 (b)). This operation sequence will be explained in accordance with a flow chart of a diaphragm adjustment operation sequence in FIG. 8.

First, at step 201, the controller 112 ascertains whether a timing signal has been input or not. If it has not been input (N), the operation returns to 201; and if it has been input (Y), then an integral value $V_A$ is input via the A/D converter 110 (step 202). Then this value $V_A$ is compared with an allowable maximum value $V_{R1}$ (step 203). When $V_A > V_{R1}$ (Y), it is ascertained that the amount of the incident light is in excess, so that the iris 103 is stopped down by 1 step via the motor 106 (step 204). Now, the operation in this case is finished and the operation proceeds to the next operation (step 208).

When $V_A > V_{R1}$ (N) in the step 203, the value $V_A$ is compared with an allowable minimum value $V_{R2}$ (step 205). Then, if $V_A > V_{R2}$ (Y), it is ascertained that the amount of the incident light is insufficient, so that the iris 103 is opened by 1 step via the motor 106 (step 206). Now, this portion of the operation is finished, and the operation proceed to the next portion (step 208).

When $V_A > V_{R2}$ (N) in the step 205, it is ascertained that the amount of the incident light is proper, so that the iris 103 is left unchanged (step 207). Now, this portion of the operation is finished, and the operation proceeds to the next portion (step 208).

It wil be noted that here the maximum/minimum allowable values $V_{R1}/V_{R2}$ of the integrated value $V_A$ are determined, for example, $V_{R1} = 1.4\ V_R$ and $V_{R2} = 0.7\ V_R$ with regard to the target value $V_R$ of the integrated amount of light.

Further, in regard to the correcting of these values, it may be supposed, for example, that correcting is carried out in $2^{0.5}$ steps. In such case, the target values for the iris adjustment may be tabulated as shown in below in TABLE 1 for subsequent reference.

The reason for setting the threshold level with steps of $2^{0.5}$ is as follows.

The dynamic range of light intensity is extremely wide, so that when exposure control is performed based on data measured with a linear scale, the range of the measured value becomes very large, resulting in a complication of the circuit which carries out arithmetic operations and control. Consequently, in the present embodiment, when the amount of light is n measured, the range of the measured data level is compressed by performing a logarithmic compression with the base 2. The exposure control is then performed by using these compressed data. With this procedure, the processing of data and the control based in these data becomes easier. By thus designing the system, it is only required to set linear data such as 0.5, 1, 1.5, 2, etc., for $V_{R1}$, $V_{R2}$ and so forth in order to perform an exposure control with $2^{0.5}$ steps, i.e., $2^{0.5}$, $2^1$, $2^{1.5}$, $2^2$, etc. That is, $V_{R1}$ and $V_{R2}$ shown in Table 1 form a series which is different by ±0.5 with regard to $V_{R15}$ and $V_{R25}$, as described above. That is, in this case, No. 5 is the standard value $NR_o$), and the smaller the $N_o$ value is, the lower the target amount of the incident light becomes.

TABLE 1

Table of target values for the iris adjustment

| $N_o = NR$ | $V_{R1}$ | $V_{R2}$ | | |
|---|---|---|---|---|
| 0 | $V_{R10}$ | $V_{R20}$ | ↑ | (−) |
| 1 | $V_{R11}$ | $V_{R21}$ | ↑ | |
| 2 | $V_{R12}$ | $V_{R22}$ | ↑ | |
| 3 | $V_{R13}$ | $V_{R23}$ | ↑ | |
| 4 | $V_{R14}$ | $V_{R24}$ | ↑ | |
| 5 | $V_{R15}$ | $V_{R25}$ | Standard value $NR_0$ | |
| 6 | $V_{R16}$ | $V_{R26}$ | ↓ | (+) |
| 7 | $V_{R17}$ | $V_{R27}$ | ↓ | |
| 8 | $V_{R18}$ | $V_{R28}$ | ↓ | |
| 9 | $V_{R19}$ | $V_{R29}$ | ↓ | |
| 10 | $V_{R1A}$ | $V_{R2A}$ | ↓ | |

Now, the operation of correcting the exposure will be explained with reference to the flow chart of an exposure correction operation sequence in FIG. 9. First, the controller 112 reads the state of the designating unit of the iris operation 116, and ascertains whether the level is "high" or "low". If in step 301, this level becomes "high", the controller 112 reads the state of the "up" operation unit 118, and ascertain whether the level is "high" or "low" (step 302). Here, if the level is "high" (Y), it is ascertained whether a target value of photometry NR is 0 or not (step 303). If the target value of photometry NR is 0 (Y), it is impossible to open the iris further, so that the "up"/"down" operation units 118/119 are checked again. If ≠NR 0 (N), the target value of photometry NR is shifted from the actual value to a value which is one rank higher (a value with a smaller $N_o$) in TABLE 1 (step 304).

If in step 302, the level of the "up" operation unit 118 is "low" (N), the controller 112 performs an operation in accordance with that described above with regard to the "down" operation unit 119. That is, if the level of the unit 119 is "high", a check is made as to whether NR≠0 or not; and if the answer is yes, the operation returns to step 302 again, and if the answer is no, NR is increased by one increment, and then the operation returns to step 302. If the level of the unit 119 is "low", the aforementioned sequence is repeated until any of the operation units 114, 115 and 120 becomes "on", and when any of them becomes "on", the aforementioned sequence is finished.

Figure 10:
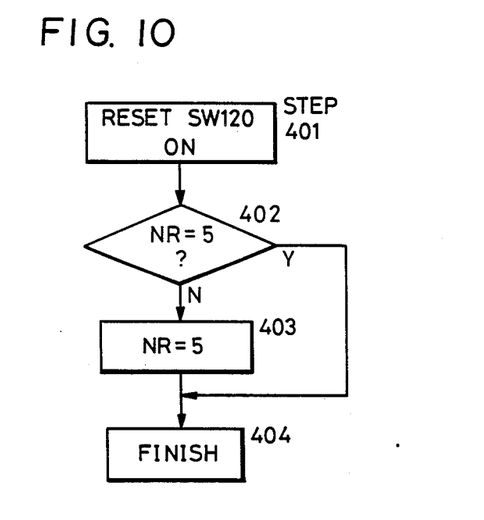
FIG. 10 is a flow chart of a reset operation which may be performed in the apparatus of FIGS. 1-6.

A flow chart of an example of a reset operation is illustrated in FIG. 10. First, when the level of the reset operation unit 120 is "high" in step 401, it is ascertained whether a target value of the iris control NR equals the standard value 5 (i.e., $NR_o$) or not in step 402, and if the answer is not (N), it is set so that NR=5 in step 403, and the operation is finished (step 404).

As described above, the corrected exposure value is switched to the standard value $NR_o$ of the automatic exposure mechanism by the reset button 25, hence the operability as well as the accuracy are improved, and at the same time the deflection of the picture disappears.

As explained above, according to the present invention, the correction value of the amount of exposure of an image input apparatus is convertible into the standard value of automatic exposure means by reset means, resulting, in a remarkable improvement in the operability of the apparatus.

The individual components shown in outline form in FIGS. 1–4 or designated by blocks in FIG. 5 are all well known in the video and microprocessing fields and their specific construction and operation is not critical to the operation or best mode for carrying out the invention.

Figure 8:
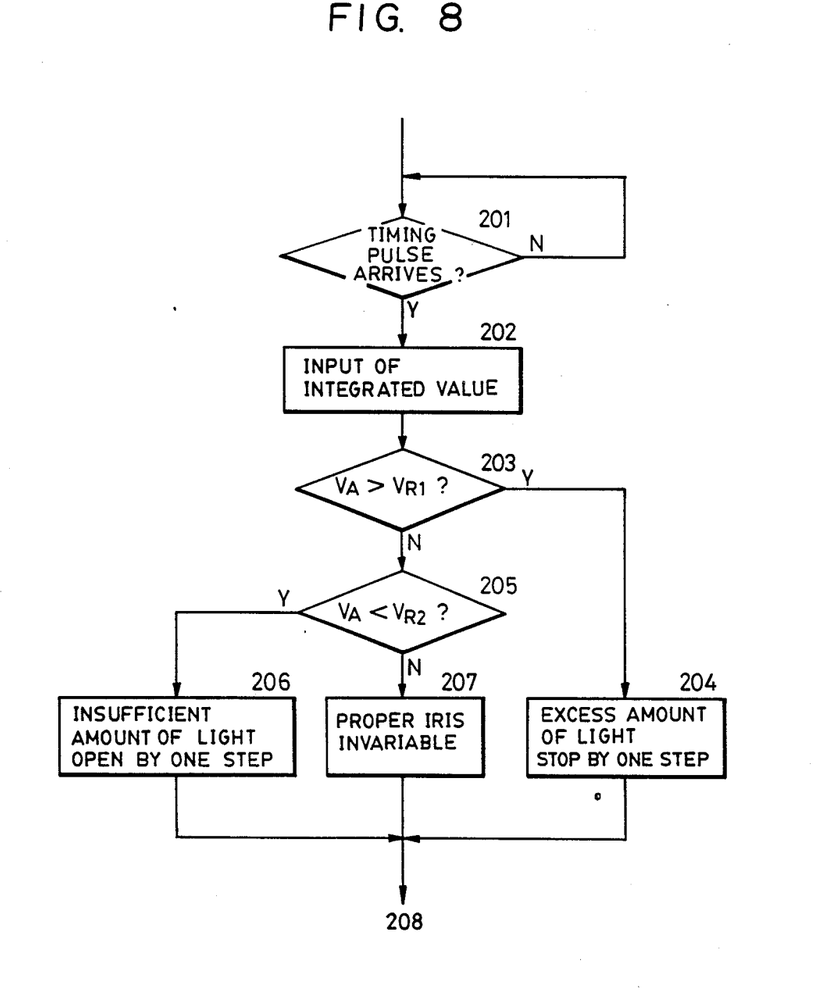
FIG. 8 is a flow chart of an iris adjustment operation sequence carried out in the apparatus of FIGS. 1-6.
Figure 9:
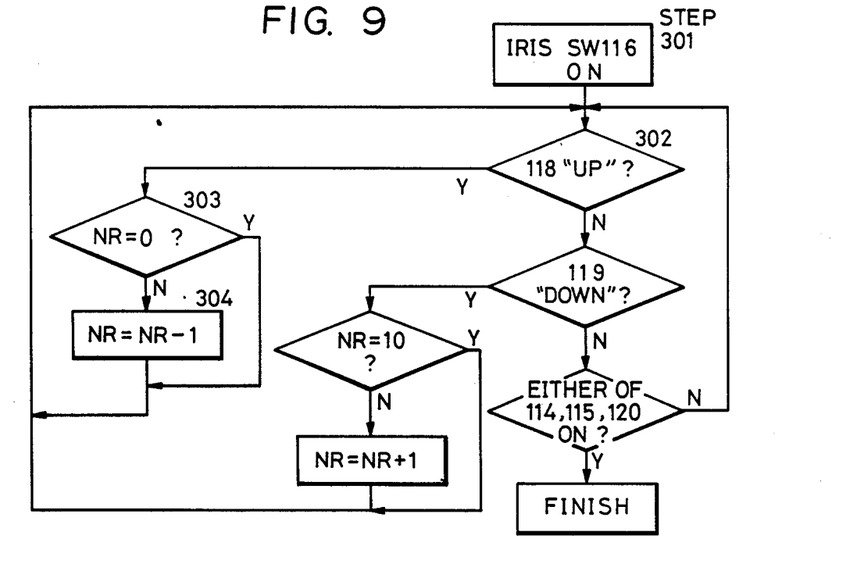
FIG. 9 is a flow chart of an exposure correction operation sequence carried out in the apparatus of FIGS. 1-6.

Moreover, the steps represented in FIGS. 8-10 can easily be programmed into well known microprocessors by persons of ordinary skill and since such programming per se is not part of this invention no further description thereof is deemed necessary.

What is claimed is:

1. An image input apparatus comprising:
   a lens unit;
   photoelectric conversion means arranged to be exposed to optical images from the lens unit;
   automatic exposure means for controlling an amount of exposure of said photoelectric conversion means so that the amount of exposure becomes a predetermined standard value;
   correction means for adjusting said automatic exposure means to modify said standard value to a correction value; and
   reset means for converting said correction value to the predetermined standard value.

2. An image input apparatus according to claim 1 wherein said correction means includes an up/down switch.

3. An image input apparatus according to claim 1 further including zooming mode selection means for selecting a mode for adjusting a focal lenght of the lens unit by said correction means.

4. An image input apparatus according to claim 3 further including focusing mode selection means for selecting a mode for adjusting a position of the focus of the lens unit by said correction means.

5. An image input apparatus according to claim 1, further including focusing mode selection means for selecting a mode for adjusting a position of the focus of the lens unit by said correction means.

6. An image input apparatus comprising:
   (a) a lens unit;
   (b) a photoelectric conversion unit for photoelectrically converting light received through said lens unit;
   (c) selection means arranged to select a first mode for modifying data representing an amount of light exposure on said photoelectric conversion unit, and a second mode for modifying data representing a focal length of said lens unit;
   (d) a common increase/decrease change-over switch for increasing and decreasing corresponding data in each mode selected by said selection means;
   (e) automatic exposure means for controlling an amount of exposure of said photoelectric conversion means so that the amount of exposure becomes a predetermined standard value; and
   (f) correction means for adjusting said automatic exposure means to modify the standard value to a correction value.

7. An image input apparatus according to claim 6 further including:
   drive means for modifying (1) an amount of light exposure on said photoelectric conversion unit, and (2) the focal length of said lens unit, according to data increased or decreased in accordance with a state of said increase/decrease change-over switch.

8. An image input apparatus according to claim 6 wherein said first selection means has a third mode for modifying data representing a position of the focus of said lens unit.

9. An image input apparatus according to claim 8 further including drive means for modifying the position of the focus of said lens unit in accordance with a state of said increase/decrease change-over switch in said third mode.

10. An image input apparatus comprising:
    (a) a lens unit;
    (b) a photoelectric conversion unit for photoelectrically converting light received through said lens unit;
    (c) selection means having a first mode for modifying data representing an amount of light exposure on said photoelectric conversion unit, and a second mode for modifying data representing a position of the focus of said lens unit;
    (d) a common increase/decrease change-over switch for increasing and decreasing corresponding data in each mode selected by said selecting means;
    (e) automatic exposure means for controlling an amount of exposure of said photoelectric conversion means so that the amount of exposure becomes a predetermined standard value; and
    (f) correction means for adjusting said automatic exposure means to modify the standard value to a correction value.

11. An image input apparatus according to claim 10 further including:
    drive means for modifying (1) an amount of light exposure on said photoelectric conversion unit, and (2) the position of the focus of said lens unit, respectively, based on data increased or decreased in accordance with a state of said increase/decrease change-over switch.

12. An image input apparatus according to claim 10 wherein said selection means has a third mode for modifying data of a focal length of said lens unit.

13. An image input apparatus according to claim 11 further including drive means for modifying the focal length of said lens unit in accordance with a state of said increase/decrease change-over switch in said third mode.

14. An image input apparatus comprising:
    (a) a lens unit;
    (b) a photoelectric conversion unit for photoelectrically converting light received through said lens unit;
    (c) selection means having a first mode for modifying data representative of a focal length of said lens unit, and a second mode for modifying data representative of a position of the focus of said lens unit;
    (d) a common increase/decrease change-over switch for increasing said decreasing corresponding data in each mode selected by said selection means;
    (e) automatic exposure means for controlling an amount of exposure of said photoelectric conversion means so that the amount of exposure becomes a predetermined standard value; and
    (f) correction means for adjusting said automatic exposure means to modify the standard value to a correction value.

15. An image input apparatus according to claim 14 further including:
    drive means for modifying (1) the focal length, and (2) the position of the focus of said lens unit, respectively, according to the data increased or decreased in accordance with a state of said increase/decrease change-over switch.

16. An image input apparatus according to claim 14 wherein said selection means has a third mode for modifying data representative of an amount of light exposure on said photoelectric conversion unit.

17. An image input apparatus according to claim 16 further including drive means for modifying an amount of light exposure on said photoelectric conversion unit in accordance with a state of said increase/decrease change-over switch in said third mode.

* * * * *

UNITED STATES PATENT AND TRADEMARK OFFICE
CERTIFICATE OF CORRECTION

PATENT NO. : 4,963,986  
DATED : October 16, 1990  
INVENTOR(S) : FUKUYAMA, ET AL.

Page 1 of 4

It is certified that error appears in the above-identified patent and that said Letters Patent is hereby corrected as shown below:

ON THE TITLE PAGE, ITEM [54]:

"IMAGE INPUT APPARATUS FOR RESETTING THE AMOUNT OF EXPOSURE FROM A CORRECTION VALUE FOR A PREDETERMINED STANDARD VALUE" should read --IMAGE INPUT APPARATUS FOR RESETTING THE AMOUNT OF EXPOSURE FROM A CORRECTION VALUE TO A PREDETERMINED STANDARD VALUE--.

COLUMN 1

Line 4, "FOR" should read --TO--.
Line 17, "the apparatus is of" should read --apparatus is of the--.
Line 41, "is ob-" should read --is an ob---.
Line 42, "eleminate" should read --eliminate--.
Line 51, "value" should read --value,--.
Line 65, "stardart" should read --standard--.

COLUMN 2

Line 5, "phootelectric convertion unit," should read --photoelectric conversion unit,--.
Line 12, "legth" should read --length--.
Line 17, "unit,a" should read --unit, a--.
Line 37, "DRAWINS" should read --DRAWINGS--.
Line 46, "control system" should read --a control system--.
Line 50, "apparatus" should read --apparatus of--.
Line 59, "FIGS. 1-6;" should read --FIGS. 1-6.--.

UNITED STATES PATENT AND TRADEMARK OFFICE
CERTIFICATE OF CORRECTION

PATENT NO. : 4,963,986

DATED : October 16, 1990

INVENTOR(S) : FUKUYAMA, ET AL.

It is certified that error appears in the above-identified patent and that said Letters Patent is hereby corrected as shown below:

COLUMN 3

Line 25, "introducin" should read --for introducing--.
    Line 29, "electrically" should read --electrically--.
    Line 32, "remote control device 1" should read --remote control device 10--.
    Line 34, "devi" should read --device--.
    Line 35, "devices) 11" should read --device) 11,--.
    Line 44, "ca tube 19" should read --cam tube 19--.
    Line 49, "settin." should read --setting.--.
    Line 50, "is" should be deleted.
    Line 62, "and" should read --an--.
    Line 64, "ajustment" should read --adjustment--.
    Line 67, "an" should read --and--.

COLUMN 4

Line 21, "and" should read --an--.
    Line 23, "controlled 112" should read --controller 112--.
    Line 27, "an" should read --and--.
    Line 29, "terminal" should read --terminal e-- and "desginate" should read --designate--.
    Line 40, "an" (first occurrence) should read --and--.
    Line 43, ""near"/"far"" should read --"the near"/"far"--.
    Line 55, "as" should read --an--.
    Line 58, "weighting in" should read --weighting. In--.
    Line 65, "waveform" should read --waveform (b)--.
    Line 66, "in" (first occurrence) should be deleted.

UNITED STATES PATENT AND TRADEMARK OFFICE
CERTIFICATE OF CORRECTION

PATENT NO. : 4,963,986

DATED : October 16, 1990

INVENTOR(S) : FUKUYAMA, ET AL.

It is certified that error appears in the above-identified patent and that said Letters Patent is hereby corrected as shown below:

COLUMN 5

Line 5, "synchronizin" should read --synchronizing-- and "relecved." should read --received.--.
Line 26, "$V_A > V_{R2}$ (Y)," should read --$V_A < V_{R2}$ (N),--.
Line 30, "proceed" should read --proceeds--.
Line 31, "$V_A > V_{R2}$ (N)" should read --$V_A < V_{R2}$ (N)--.
Line 36, "wil" should read --will--.
Line 44, "in" (first occurrence) should be deleted.
Line 54, "n" should be deleted.
Line 59, "in" should read --on--.
Line 66, "standard value $NR_o$)," should read --standard value ($NR_o$),--.

COLUMN 6

Line 22, "ascertain" should read --ascertains--.
Line 28, "$\neq$ NR 0 (N)," should read --NR $\neq$ 0 (N),--.
Line 51, "not (N)," should read --no (N),--.
Line 62, "resulting," should read --resulting--.

COLUMN 7

Line 24, "lenght" should read --length--.

UNITED STATES PATENT AND TRADEMARK OFFICE
CERTIFICATE OF CORRECTION

PATENT NO. : 4,963,986

DATED : October 16, 1990

INVENTOR(S) : FUKUYAMA, ET AL.

It is certified that error appears in the above-identified patent and that said Letters Patent is hereby corrected as shown below:

COLUMN 8

Line 29, "claim 11" should read --claim 12--.
    Line 44, "increasing said decreasing" should read --increasing and decreasing--.

Signed and Sealed this

Eleventh Day of August, 1992

Attest:

DOUGLAS B. COMER

*Attesting Officer*      *Acting Commissioner of Patents and Trademarks*